US008879761B2

(12) United States Patent
Johnson et al.

(10) Patent No.: US 8,879,761 B2
(45) Date of Patent: Nov. 4, 2014

(54) ORIENTATION-BASED AUDIO

(75) Inventors: Martin E. Johnson, Los Gatos, CA (US); Ruchi Goel, San Jose, CA (US); Darby E. Hadley, Los Gatos, CA (US); John Raff, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 413 days.

(21) Appl. No.: 13/302,673

(22) Filed: Nov. 22, 2011

(65) Prior Publication Data

US 2013/0129122 A1 May 23, 2013

(51) Int. Cl.
*H04R 5/02* (2006.01)
*G06F 17/00* (2006.01)
*G09G 5/00* (2006.01)
*H04R 5/04* (2006.01)
*H04R 3/12* (2006.01)

(52) U.S. Cl.
CPC .............. *H04R 3/12* (2013.01); *H04R 2499/11* (2013.01); *H04R 5/04* (2013.01)
USPC .............................. 381/306; 345/659; 700/94

(58) Field of Classification Search
CPC .............. G09G 2340/0492; G09G 2220/1614; H04R 5/00; H04R 5/04; H04R 29/001; H04R 3/12; H04R 2499/15
USPC ............. 700/94; 345/659; 381/300, 306, 333; 715/716
See application file for complete search history.

(56) References Cited

U.S. PATENT DOCUMENTS 1,893,291 A 1/1933 Kwartin
4,068,103 A 1/1978 King et al.
4,081,631 A 3/1978 Feder
4,089,576 A 5/1978 Barchet
4,245,642 A 1/1981 Skubitz et al.
4,466,441 A 8/1984 Skubitz et al.
4,658,425 A 4/1987 Julstrom
4,684,899 A 8/1987 Carpentier
5,060,206 A 10/1991 DeMetz
5,106,318 A 4/1992 Endo et al.
5,121,426 A 6/1992 Baumhauer, Jr. et al.
5,293,002 A 3/1994 Grenet et al.
5,335,011 A 8/1994 Addeo et al.
5,406,038 A 4/1995 Reiff et al.
5,570,324 A 10/1996 Geil
5,604,329 A 2/1997 Kressner et al.

(Continued)

FOREIGN PATENT DOCUMENTS

EP 2094032 8/2009
GB 2310559 8/1997

(Continued)

OTHER PUBLICATIONS

Baechtle et al., "Adjustable Audio Indicator," IBM, 2 pages, Jul. 1, 1984.

(Continued)

*Primary Examiner* — Jesse Elbin
(74) *Attorney, Agent, or Firm* — Blakely, Sokoloff, Taylor & Zafman LLP

(57) ABSTRACT

A method and apparatus for outputting audio based on an orientation of an electronic device, or video shown by the electronic device. The audio may be mapped to a set of speakers using either or both of the device and video orientation to determine which speakers receive certain audio channels.

21 Claims, 4 Drawing Sheets

(56) References Cited

U.S. PATENT DOCUMENTS 5,619,583 A 4/1997 Page et al.
5,649,020 A 7/1997 McClurg et al.
5,691,697 A 11/1997 Carvalho et al.
5,733,153 A 3/1998 Takahashi et al.
5,879,598 A 3/1999 McGrane
6,036,554 A 3/2000 Koeda et al.
6,069,961 A 5/2000 Nakazawa
6,073,033 A 6/2000 Campo
6,129,582 A 10/2000 Wilhite et al.
6,138,040 A 10/2000 Nicholls et al.
6,151,401 A 11/2000 Annaratone
6,154,551 A 11/2000 Frenkel
6,192,253 B1 2/2001 Charlier et al.
6,246,761 B1 6/2001 Cuddy
6,278,787 B1 8/2001 Azima
6,317,237 B1 11/2001 Nakao et al.
6,324,294 B1 11/2001 Azima et al.
6,332,029 B1 12/2001 Azima et al.
6,342,831 B1 1/2002 Azima
6,469,732 B1 10/2002 Chang et al.
6,618,487 B1 9/2003 Azima
6,757,397 B1 6/2004 Buecher et al.
6,813,218 B1 11/2004 Antonelli et al.
6,829,018 B2 12/2004 Lin et al.
6,882,335 B2 4/2005 Saarinen
6,914,854 B1 7/2005 Heberley
6,934,394 B1 8/2005 Anderson
6,980,485 B2 12/2005 McCaskill
7,003,099 B1 2/2006 Zhang et al.
7,054,450 B2 5/2006 McIntosh et al.
7,082,322 B2 7/2006 Harano
7,130,705 B2 10/2006 Amir et al.
7,154,526 B2 12/2006 Foote et al.
7,158,647 B2 1/2007 Azima et al.
7,190,798 B2 3/2007 Yasuhara
7,194,186 B1 3/2007 Strub et al.
7,263,373 B2 8/2007 Mattisson
7,266,189 B1 9/2007 Day
7,346,315 B2 3/2008 Zurek et al.
7,378,963 B1 5/2008 Begault et al.
7,527,523 B2 5/2009 Yohn et al.
7,536,029 B2 5/2009 Choi et al.
7,570,772 B2 8/2009 Sorensen et al.
7,679,923 B2 3/2010 Inagaki et al.
7,848,529 B2 12/2010 Zhang et al.
7,867,001 B2 1/2011 Ambo et al.
7,878,869 B2 2/2011 Murano et al.
7,912,242 B2 3/2011 Hikichi
7,966,785 B2 6/2011 Zadesky et al.
8,030,914 B2 10/2011 Alameh et al.
8,031,853 B2 10/2011 Bathurst et al.
8,055,003 B2 11/2011 Mittleman et al.
8,116,505 B2 2/2012 Kawasaki-Hedges et al.
8,116,506 B2 2/2012 Kuroda et al.
8,135,115 B1 3/2012 Hogg et al.
8,184,180 B2 5/2012 Beaucoup
8,226,446 B2 7/2012 Kondo et al.
8,300,845 B2 10/2012 Zurek et al.
8,401,210 B2 3/2013 Freeman
8,447,054 B2 5/2013 Bharatan et al.
8,452,019 B1 5/2013 Fomin et al.
8,488,817 B2 7/2013 Mittleman et al.
8,574,004 B1 11/2013 Tarchinski et al.
8,620,162 B2 12/2013 Mittleman
2001/0011993 A1* 8/2001 Saarinen ........................ 345/156
2001/0017924 A1 8/2001 Azima et al.
2001/0026625 A1 10/2001 Azima et al.
2002/0012442 A1 1/2002 Azima et al.
2002/0037089 A1 3/2002 Usuki et al.
2002/0044668 A1 4/2002 Azima et al.
2002/0150219 A1 10/2002 Jorgenson et al.
2003/0048911 A1 3/2003 Furst et al.
2003/0053643 A1 3/2003 Bank et al.
2003/0161493 A1 8/2003 Hosler
2003/0171936 A1 9/2003 Sall et al.
2003/0236663 A1 12/2003 Dimitrova et al.
2004/0013252 A1 1/2004 Craner et al.
2004/0156527 A1 8/2004 Stiles et al.
2004/0203520 A1 10/2004 Schirtzinger et al.
2004/0263636 A1 12/2004 Cutler et al.
2005/0129267 A1 6/2005 Azima
2005/0147273 A1 7/2005 Azima et al.
2005/0152565 A1 7/2005 Jouppi et al.
2005/0182627 A1 8/2005 Tanaka et al.
2005/0209848 A1 9/2005 Ishii
2005/0226455 A1 10/2005 Aubauer et al.
2005/0238188 A1 10/2005 Wilcox
2005/0271216 A1 12/2005 Lashkari
2006/0005156 A1 1/2006 Korpipaa
2006/0023898 A1 2/2006 Katz
2006/0045294 A1 3/2006 Smyth
2006/0072248 A1 4/2006 Watanabe et al.
2006/0206560 A1 9/2006 Kanada
2006/0239471 A1 10/2006 Mao et al.
2006/0256983 A1 11/2006 Kenoyer et al.
2006/0279548 A1 12/2006 Geaghan
2007/0011196 A1 1/2007 Ball et al.
2007/0188901 A1 8/2007 Heckerman et al.
2007/0291961 A1* 12/2007 Shin ............................. 381/111
2008/0063211 A1* 3/2008 Kusunoki ........................ 381/18
2008/0130923 A1 6/2008 Freeman
2008/0175408 A1 7/2008 Mukund et al.
2008/0204379 A1 8/2008 Perez-Noguera
2008/0292112 A1 11/2008 Valenzuela et al.
2008/0310663 A1 12/2008 Shirasaka et al.
2009/0018828 A1 1/2009 Nakadai et al.
2009/0048824 A1 2/2009 Amada
2009/0060222 A1 3/2009 Jeong
2009/0070102 A1 3/2009 Maegawa
2009/0094029 A1 4/2009 Koch et al.
2009/0247237 A1 10/2009 Mittleman et al.
2009/0274315 A1 11/2009 Carnes et al.
2009/0304198 A1 12/2009 Herre et al.
2009/0316943 A1 12/2009 Munoz et al.
2010/0062627 A1 3/2010 Ambo et al.
2010/0066751 A1* 3/2010 Ryu et al. ...................... 345/629
2010/0080084 A1 4/2010 Chen et al.
2010/0103776 A1 4/2010 Chan
2010/0110232 A1 5/2010 Zhang
2011/0002487 A1 1/2011 Panther et al.
2011/0033064 A1 2/2011 Johnson et al.
2011/0038489 A1 2/2011 Visser et al.
2011/0087491 A1 4/2011 Wittenstein et al.
2011/0161074 A1 6/2011 Pance et al.
2011/0164141 A1 7/2011 Tico
2011/0193933 A1 8/2011 Ryu et al.
2011/0243369 A1 10/2011 Wang
2011/0274303 A1 11/2011 Filson et al.
2011/0316768 A1* 12/2011 McRae ........................... 381/80
2012/0082317 A1 4/2012 Pance et al.
2012/0177237 A1 7/2012 Shukla et al.
2012/0243698 A1 9/2012 Elko et al.
2012/0250928 A1 10/2012 Pance et al.
2012/0263019 A1 10/2012 Armstong-Muntner
2012/0306823 A1 12/2012 Pance et al.
2012/0330660 A1 12/2012 Jaiswal
2013/0017738 A1 1/2013 Asakuma et al.
2013/0028443 A1 1/2013 Pance et al.
2013/0051601 A1 2/2013 Hill
2013/0053106 A1 2/2013 Kwong
2013/0129122 A1 5/2013 Johnson
2013/0142355 A1 6/2013 Isaac
2013/0142356 A1 6/2013 Isaac
2013/0164999 A1 6/2013 Ge et al.
2013/0259281 A1 10/2013 Filson et al.
2013/0280965 A1 10/2013 Kojyo

FOREIGN PATENT DOCUMENTS

GB 2342802 4/2000
JP 62-189898 8/1987

(56) References Cited

FOREIGN PATENT DOCUMENTS

| | | | |
|---|---|---|---|
| JP | 2102905 | | 4/1990 |
| JP | 2003-032776 | | 1/2003 |
| JP | 2004153018 | | 5/2004 |
| JP | 2006297828 | | 11/2006 |
| JP | 2007-081928 | | 3/2007 |
| WO | WO 01/93554 | A2 | 12/2001 |
| WO | WO03/049494 | | 6/2003 |
| WO | WO2004/025938 | | 3/2004 |
| WO | WO 2007045908 | | 4/2007 |
| WO | WO2008/153639 | | 12/2008 |
| WO | WO2009/017280 | | 2/2009 |
| WO | WO2011/057346 | | 5/2011 |
| WO | WO2011/061483 | | 5/2011 |

OTHER PUBLICATIONS

Pingali et al., "Audio-Visual Tracking for Natural Interactivity," Bell Laboratories, Lucent Technologies, pp. 373-382, Oct. 1999.

"Snap fit theory", Feb. 23, 2005, DSM, p. 2.

European Extended Search Report, EP 12178106.6, Jul. 11, 2012, 8 pages.

PCT International Search Report and Written Opinion, PCT/US2011/052589, Feb. 25, 2012, 13 pages.

PCT International Search Report and Written Opinion, PCT/US2012/0045967 Nov. 7, 2012, 10 pages.

PCT International Search Report and Written Opinion, PCT/US2012/057909, Feb. 19, 2013, 14 pages.

PCT International Preliminary Report on Patentability, PCT/US2011/052589, Apr. 11, 2013, 9 pages.

* cited by examiner

ORIENTATION-BASED AUDIO

TECHNICAL FIELD

This application relates generally to playing audio, and more particularly to synchronizing audio playback from multiple outputs to an orientation of a device, or video playing on a device.

BACKGROUND

The rise of portable electronic devices has provided unprecedented access to information and entertainment. Many people use portable computing devices, such as smart phones, tablet computing devices, portable content players, and the like to store and play back both audio and audiovisual content. For example, it is common to digitally store and play music, movies, home recordings and the like.

Many modern portable electronic devices may be turned by a user to re-orient information displayed on a screen of the device. As one example, some people prefer to read documents in a portrait mode while others prefer to read documents shown in a landscape format. As yet another example, many users will turn an electronic device on its side while watching widescreen video to increase the effective display size of the video.

Many current electronic devices, even when re-oriented in this fashion, continue to output audio as if the device is in a default orientation. That is, left channel audio may be omitted from the same speaker(s) regardless of whether or not the device is turned or otherwise re-oriented; the same is true for right channel audio and other audio channels.

SUMMARY

One embodiment described herein takes the form of a method for outputting audio from a plurality of speakers associated with an electronic device, including the operations of: determining an orientation of video displayed by the electronic device; using the determined orientation of video to determine a first set of speakers generally on a left side of the video being displayed by the electronic device; using the determined orientation of video to determine a second set of speakers generally on a right side of the video being displayed by the electronic device; routing left channel audio to the first set of speakers for output therefrom; and routing right channel audio to the second set of speakers for output therefrom.

Another embodiment takes the form of an apparatus for outputting audio, including: a processor; an audio processing router operably connected to the processor; a first speaker operably connected to the audio processing router; a second speaker operably connected to the audio processing router; a video output operably connected to the processor, the video output operative to display video; an orientation sensor operably connected to the audio processing router and operative to output an orientation of the apparatus; wherein the audio processing router is operative to employ at least one of the orientation of the apparatus and an orientation of the video displayed on the video output to route audio to the first speaker and second speaker for output.

Still another embodiment takes the form of a method for outputting audio from an electronic device, including the operations of: determining a first orientation of the electronic device; based on the first orientation, routing a first audio channel to a first set of speakers; based on the first orientation, routing a second audio channel to a second set of speakers; determining that the electronic device is being re-oriented from the first orientation to a second orientation; based on the determination that the electronic device is being re-oriented, transitioning the first audio channel to a third set of speakers; and based on the determination that the electronic device is being re-oriented, transitioning the second audio channel to a fourth set of speakers; wherein the first set of speakers is different from the third set of speakers; the second set of speakers is different from the fourth set of speakers; and during the operation of transitioning the first set of audio, playing at least a portion of the first audio channel and the second audio channel from at least one of the first set of speakers and third set of speakers.

DETAILED DESCRIPTION

Figures 1, 2:
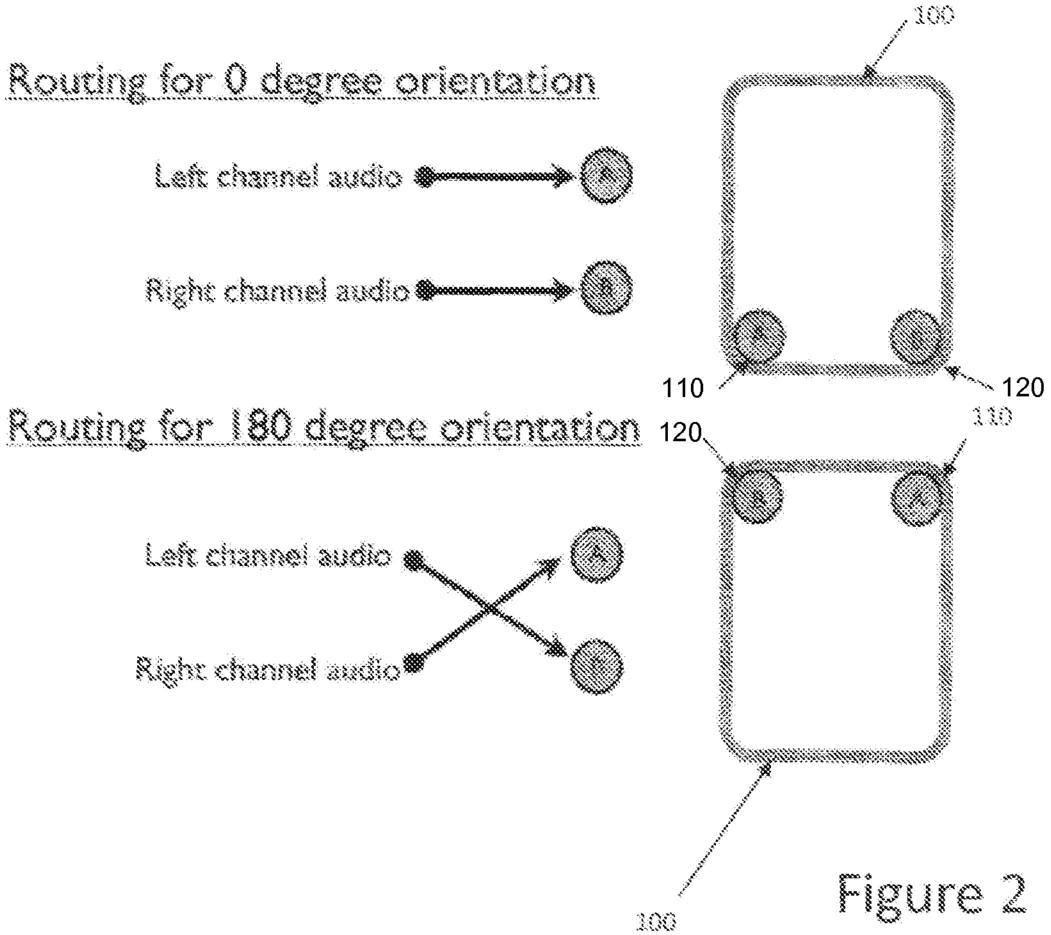
FIG. 1 depicts a sample portable device having multiple speakers and in a first orientation.
FIG. 2 depicts the sample portable device of FIG. 1 in a second orientation.

Generally, embodiments described herein may take the form of devices and methods for matching an audio output to an orientation of a device providing the audio output. Thus, for example, as a device is rotated, audio may be routed to device speakers in accordance with the video orientation. To elaborate, consider a portable device having two speakers, as shown in FIG. 1. When the device 100 is in the position depicted in FIG. 1, left channel audio from an audiovisual source may be routed to speaker A 110. Likewise, right channel audio from the source may be routed to speaker B 120. "Left channel audio" and "right channel audio" generally refer to audio intended to be played from a left output or right output as encoded in an audiovisual or audio source, such as a movie, television show or song (all of which may be digitally encoded and stored on a digital storage medium, as discussed in more detail below).

When the device 100 is rotated 180 degrees, as shown in FIG. 2, left channel audio may be routed to speaker B 120 while right channel audio is routed to speaker A 110. If video is being shown on the device 100, this re-orientation of the audio output generally matches the rotation of the video, or ends with the video and audio being re-oriented in a similar fashion. In this manner, the user perception of the audio remains the same at the end of the device re-orientation as it was prior to re-orientation. To the user, the left-channel audio initially plays from the left side of the device and remains playing from the left side of the device after it is turned upside down and the same is true for right-channel audio. Thus, even though the audio has been re-routed to different speakers, the user's perception of the audio remains the same.

It should be appreciated that certain embodiments may have more than two speakers, or may have two speakers positioned in different locations than those shown in FIGS. 1 and 2. The general concepts and embodiments disclosed herein nonetheless may be applicable to devices having different speaker layouts and/or numbers.

Example Portable Device

Figure 3:
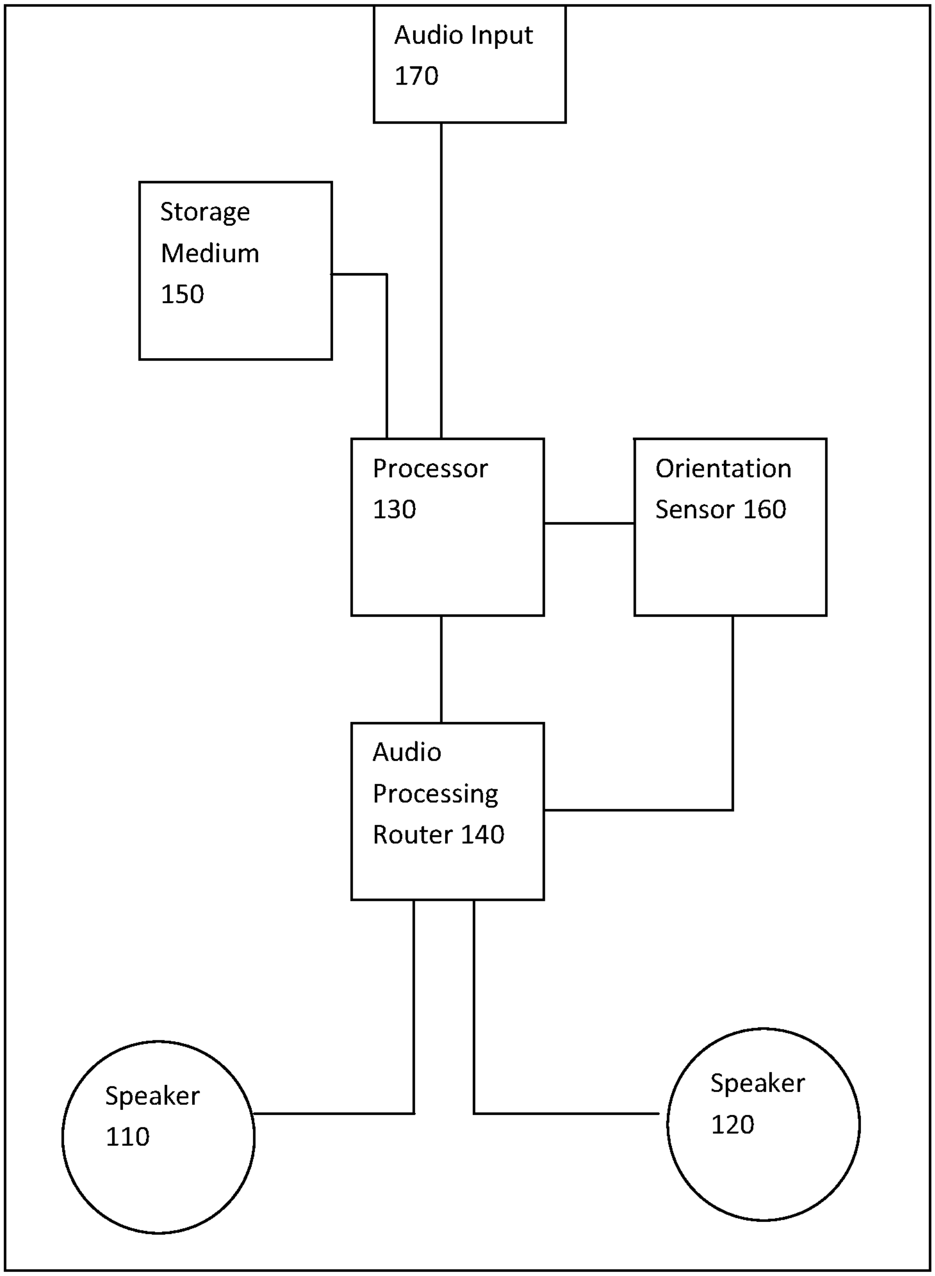
FIG. 3 is a simplified block diagram of the portable device of FIG. 1.

Turning now to FIG. 3, a simplified block diagram of the portable device of FIGS. 1 and 2 can be seen. The device may include two speakers 110, 120, a processor 130, an audio processing router 140, a storage medium 150, and an orientation sensor 160. The audio processing router 140 may take the form of dedicated hardware and/or firmware, or may be implemented as software executed by the processor 130. In embodiments where the audio processing router is implemented in software, it may be stored on the storage medium 150.

Audio may be inputted to the device through an audio input 170 or may be stored on the storage medium 150 as a digital file. Audio may be inputted or stored alone, as part of audio-visual content (e.g., movies, television shows, presentations and the like), or as part of a data file or structure (such as a video game or other digital file incorporating audio). The audio may be formatted for any number of channels and/or subchannels, such as 5.1 audio, 7.1 audio, stereo and the like. Similarly, the audio may be encoded or processed in any industry-standard fashion, including any of the various processing techniques associated with DOLBY Laboratories, THX, and the like.

The processor 130 generally controls various operations, inputs and outputs of the electronic device. The processor 130 may receive user inputs from a variety of user interfaces, including buttons, touch-sensitive surfaces, keyboards, mice and the like. (For simplicity's sake, no user interfaces are shown in FIG. 3.) The processor may execute commands to provide various outputs in accordance with one or more applications and/or operating systems associated with the electronic device. In some embodiments, the processor 130 may execute the audio processing router as a software routine. The processor may be operably connected to the speakers 110, 120, although this is not shown on FIG. 3.

The speakers 110, 120 output audio in accordance with an audio routing determined by the audio processing router 140 (discussed below). The speakers may output any audio provided to them by the audio processing router and/or the processor 130.

The storage medium 150 generally stores digital data, optionally including audio files. Sample digital audio files suitable for storage on the storage medium 150 include MPEG-3 and MPEG-4 audio, Advanced Audio Coding audio, Waveform Audio Format audio files, and the like. The storage medium 150 may also store other types of data, software, and the like. In some embodiments, the audio processing router 140 may be embodied as software and stored on the storage medium. The storage medium may be any type of digital storage suitable for use with the electronic device 100, including magnetic storage, flash storage such as flash memory, solid-state storage, optical storage and so on.

Generally, the electronic device 100 may use the orientation sensor 160 to determine an orientation or motion of the device; this sensed orientation and/or motion may be inputted to the audio processing router 140 in order to route or re-route audio to or between speakers. As one example, the orientation sensor 160 may detect a rotation of the device 100. The output of the orientation sensor may be inputted to the orientation sensor, which changes the routing of certain audio channels from a first speaker configuration to a second speaker configuration. The output of the orientation sensor may be referred to herein as "sensed motion" or "sensed orientation."

It should be appreciated that the orientation sensor 160 may detect motion, orientation, absolute position and/or relative position. The orientation sensor may be an accelerometer, gyroscope, global positioning system sensor, infrared or other electromagnetic sensor, and the like. As one example, the orientation sensor may be a gyroscope and detect rotational motion of the electronic device 100. As another example the orientation sensor may be a proximity sensor and detect motion of the device relative to a user. In some embodiments, multiple sensors may be used or aggregated. The use of multiple sensors is contemplated and embraced by this disclosure, although only a single sensor is shown in FIG. 3.

The audio processing router 140 is generally responsible for receiving an audio input and a sensed motion and determining an appropriate audio output that is relayed to the speakers 110, 120. Essentially, the audio processing router 140 connects a number of audio input channels to a number of speakers for audio output. "Input channels" or "audio channels," as used herein, refers to the discrete audio tracks that may each be outputted from a unique speaker, presuming the electronic device 100 (and audio processing router 140) is configured to recognize and decode the audio channel format and has sufficient speakers to output each channel from a unique speaker. Thus, 5.1 audio generally has five channels: front left; center; front right; rear left; and rear right. The "5" in "5.1" is the number of audio channels, while the "0.1" represents the number of subwoofer outputs supported by this particular audio format. (As bass frequencies generally sound omnidirectional, many audio formats send all audio below a certain frequency to a common subwoofer or subwoofers.)

The audio processing router 140 initially may receive audio and determine the audio format, including the number of channels. As part of its input signal processing operations, the audio processing router may map the various channels to a default speaker configuration, thereby producing a default audio map. For example, presume an audio source is a 5.1 source, as discussed above. If the electronic device 100 has two speakers 110, 120 as shown in FIG. 3, the audio processing router 140 may determine that the left front and left rear audio channels will be outputted from speaker A 110, while the right front and right rear audio channels will be outputted from speaker B 120. The center channel may be played from both speakers, optionally with a gain applied to one or both speaker outputs. Mapping a number of audio channels to a smaller number of speakers may be referred to herein as "downmixing."

As the electronic device 100 is rotated or re-oriented, the sensor 160 may detect these motions and produce a sensed motion or sensed orientation signal. This signal may indicate to the audio processing router 140 and/or processor 130 the current orientation of the electronic device, and thus the current position of the speakers 110, 120. Alternatively, the signal may indicate changes in orientation or a motion of the electronic device. If the signal corresponds to a change in orientation or a motion, the audio routing processor 140 or the processor 130 may use the signal to calculate a current orientation. The current orientation, or the signal indicating the current orientation, may be used to determine a current position of the speakers 110, 120. This current position, in turn, may be used to determine which speakers are considered left speakers, right speakers, center speakers and the like and thus which audio channels are mapped to which speakers.

It should be appreciated that this input signal processing performed by the audio processing router 140 alternatively may be done without reference to the orientation of the electronic device 100. In addition to input signal processing, the audio processing router 140 may perform output signal processing. When performing output signal processing, the audio processing router 140 may use the sensed motion or sensed orientation to re-route audio to speakers in an arrangement different from the default output map.

The audio input 170 may receive audio from a source outside the electronic device 100. The audio input 170 may, for example, accept a jack or plug that connects the electronic device 100 to an external audio source. Audio received through the audio input 170 is handled by the audio processing router 140 in a manner similar to audio retrieved from a storage device 150.

Example of Operation

Figure 4:
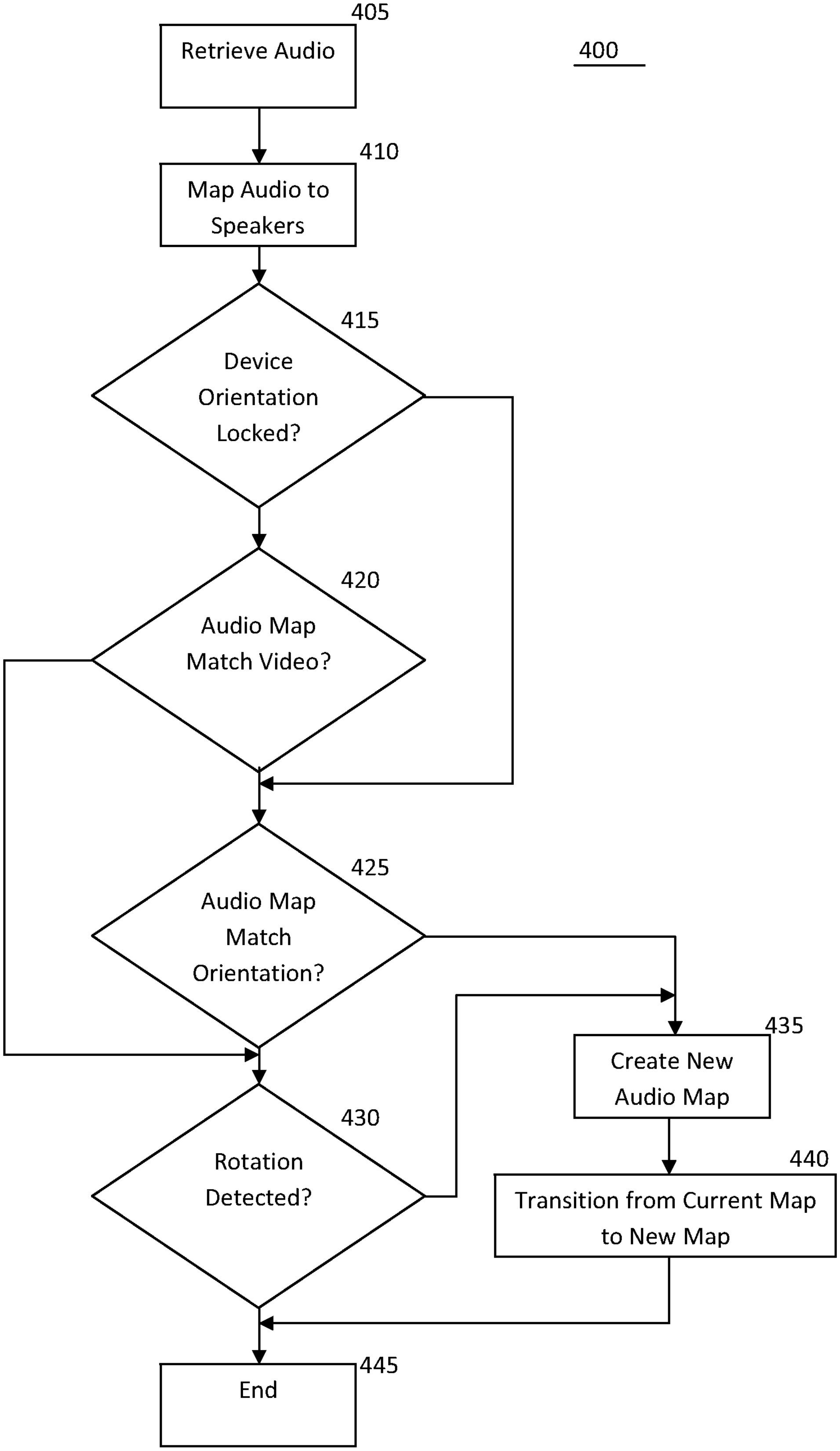
FIG. 4 is a flowchart depicting basic operations for re-orienting audio to match a device orientation.

FIG. 4 is a flowchart generally depicting the operations performed by certain embodiments to route audio from an input or storage mechanism to an output configuration based on a device orientation. The method 400 begins in operation 405, in which the embodiment retrieves audio from a storage medium 150, an audio input 170 or another audio source.

In operation 410, the audio processing router 140 creates an initial audio map. The audio map generally matches the audio channels of the audio source to the speaker configuration of the device. Typically, although not necessarily, the audio processing router attempts to ensure that left and right channel audio outputs (whether front or back) are sent to speakers on the left and right sides of the device, respectively, given the device's current orientation. Thus, front and rear left channel audio may be mixed and sent to the left speaker(s) while the front and rear right channel audio may be mixed and sent to the right speaker(s). In alternative embodiments, the audio processing router may create or retrieve a default audio map based on the number of input audio channels and the number of speakers in the device 100 and assume a default or baseline orientation, regardless of the actual orientation of the device.

Center channel audio may be distributed across multiple speakers or sent to a single speaker, as necessary. As one example, if there is no approximately centered speaker for the electronic device 100 in its current orientation, center channel audio may be sent to one or more speakers on both the left and right sides on the device. If there are more speakers on one side than the other, gain may be applied to the center channel to compensate for the disparity in speakers. As yet another option, the center channel may be suppressed entirely if no centered speaker exists.

Likewise, the audio processing router 140 may use gain or equalization to account for differences in the number of speakers on the left and right sides of the electronic device 100. Thus, if one side has more speakers than the other, equalization techniques may normalize the volume of the audio emanating from the left-side and right-side speaker(s). It should be noted that "left-side" and "right-side" speakers may refer not only to speakers located at or adjacent the left or right sides of the electronic device, but also speakers that are placed to the left or right side of a centerline of the device. Again, it should be appreciated that these terms are relative to a device's current orientation.

A sensed motion and/or sensed orientation may be used to determine the orientation of the speakers. The sensed motion/orientation provided by the sensor may inform the audio routing processor of the device's current orientation, or of motion that may be used, with a prior known orientation, to determine a current orientation. The current speaker configuration (e.g., which speakers 110 are located on a left or right side or left or right of a centerline of the device 100) may be determined from the current device orientation.

Once the audio map is created, the embodiment may determine in operation 415 if the device orientation is locked. Many portable devices permit a user to lock an orientation, so that images displayed on the device rotate as the device rotates. This orientation lock may likewise be useful to prevent audio outputted by the device 100 from moving from speaker to speaker to account for rotation of the device.

If the device orientation is locked, then the method 400 proceeds to operation 425. Otherwise, operation 420 is accessed. In operation 420, the embodiment may determine if the audio map corresponds to an orientation of any video being played on the device 100. For example, the audio processing router 140 or processor 130 may make this determination in some embodiments. A dedicated processor or other hardware element may also make such a determination. Typically, as with creating an audio map, an output from an orientation and/or location sensor may be used in this determination. The sensed orientation/motion may either permit the embodiment to determine the present orientation based on a prior, known orientation and the sensed changes, or may directly include positional data. It should be noted that the orientation of the video may be different than the orientation of the device itself. As one example, a user may employ software settings to indicate that widescreen-formatted video should always be displayed in landscape mode, regardless of the orientation of the device. As another example, a user may lock the orientation of video on the device, such that it does not reorient as the device 100 is rotated.

In some embodiments, it may be useful to determine if the audio map matches an orientation of video being played on the device 100 in addition to, or instead of, determining if the audio map matches a device orientation. The video may be oriented differently from the device either through user preference, device settings (including software settings), or some other reason. A difference between video orientation and audio orientation (as determined through the audio map) may lead to a dissonance in user perception as well as audio and/or video miscues. It should be appreciated that operations 420 and 425 may both be present in some embodiments, although other embodiments may omit one or the other.

In the event that the audio map matches the video orientation in operation 420, operation 430 is executed as described below. Otherwise, operation 425 is accessed. In operation 435, the embodiment determines if the current audio map matches the device orientation. That is, the embodiment determines if the assumptions regarding speaker 110 location that are used to create the audio map are correct, given the current orientation of the device 100. Again, this operation may be bypassed or may not be present in certain embodiments, while in other embodiments it may replace operation 420.

If the audio map does match the device 100 orientation, then operation 430 is executed. Operation 430 will be described in more detail below. If the audio map and device orientation do not match in operation 425, then the embodiment proceeds to operation 435. In operation 435, the embodiment creates a new audio map using the presumed locations and orientations of the speakers, given either or both of the video orientation and device 100 orientation. The process for creating a new audio map is similar to that described previously.

Following operation 435, the embodiment executes operation 440 and transitions the audio between the old and new audio maps. The "new" audio map is that created in operation 435, while the "old" audio map is the one that existed prior to the new audio map's creation. In order to avoid abrupt changes in audio presentation (e.g., changing the speaker 110 from which a certain audio channel emanates), the audio processing router 140 or processor 130 may gradually shift audio outputs between the two maps. The embodiment may convolve the audio channels from the first map to the second map, as one example. As another example, the embodiment may linearly transition audio between the two audio maps. As yet another example, if rotation was detected in operation 430, the embodiment may determine or receive a rate of rotation and attempt to generally match the change between audio maps to the rate of rotation (again, convolution may be used to perform this function).

Thus, one or more audio channels may appear to fade out from a first speaker and fade in from a second speaker during the audio map transition. Accordingly, it is conceivable that a single speaker may be outputting both audio from the old audio map and audio from the new audio map simultaneously. In many cases, the old and new audio outputs may be at different levels to create the effect that the old audio map transitions to the new audio map. The old audio channel output may be negatively gained (attenuated) while the new audio channel output is positively gained across some time period to create this effect. Gain, equalization, filtering, time delays and other signal processing may be employed during this operation. Likewise, the time period for transition between first and second orientations may be used to determine the transition, or rate of transition, from an old audio map to a new audio map. In various embodiments, the period of transition may be estimated from the rate of rotation or other reorientation, may be based on past rotation or other reorientation, or may be a fixed, default value. Continuing this concept, transition between audio maps may happen on the fly for smaller angles; as an example, a 10 degree rotation of the electronic device may result in the electronic device reorienting audio between speakers to match this 10 degree rotation substantially as the rotation occurs.

In some embodiments, the transition between audio maps (e.g., the reorientation of the audio output) may occur only after a reorientation threshold has been passed. For example, remapping of audio channels to outputs may occur only once the device has rotated at least 90 degrees. In certain embodiment, the device may not remap audio until the threshold has been met and the device and stops rotating for a period of time. Transitioning audio from a first output to a second output may take place over a set period of time (such as one that is aesthetically pleasing to an average listener), in temporal sync (or near-sync) to the rotation of the device, or substantially instantaneously.

After operation 435, end state 440 is entered. It should be appreciated that the end state 440 is used for convenience only. In actuality, an embodiment may continuously check for re-orientation of a device 100 or video playing on a device and adjust audio outputs accordingly. Thus, a portion or all of this flowchart may be repeated.

Operation 430 will now be discussed. As previously mentioned, the embodiment may execute operation 430 upon a positive determination from either operations 420 or 425. In operation 430, the orientation sensor 160 determines if the device 100 is being rotated or otherwise reoriented. If not, end state 445 is executed. If so, operation 435 is executed as described above.

It should be appreciated that any or all of the foregoing operations may be omitted in certain embodiments. Likewise, operations may be shifted in order. For example, operations 420, 425 and 430 may all be rearranged with respect to one another. Thus, FIG. 4 is provided as one illustration of an example embodiment's operation and not a sole method of operation.

As shown generally in at least FIGS. 5-8, the electronic device 100 may have multiple speakers 110. Three speakers are shown in FIGS. 5-8, although more may be used. In some embodiments, such as the one shown in FIGS. 1 and 2, tow speakers may be used.

The number of speakers 110 present in an electronic device 100 typically influences the audio map created by the audio processing router 140 or processor 130. First, the numbers of speakers generally indicates how many left and/or right speakers exist and thus which audio channels may be mapped to which speakers. To elaborate, consider the electronic device 500 in the orientation shown in FIG. 5. Here, speaker 510 may be considered a left speaker, as it is left of a vertical centerline of the device 500. Likewise, speaker 520 may be considered a right speaker. Speaker 530, however, may be considered a center speaker as it is approximately at the centerline of the device. This may be considered by the audio processing router 140 when constructing an audio map that routes audio from an input to the speakers 510-530.

For example, the audio processing router may downmix both the left front and left rear channels of a 5 channel audio source and send them to the first speaker 510. The right front and right rear channels may be downmixed and sent to the second speaker 520 in a similar fashion. Center audio may be mapped to the third speaker 530, as it is approximately at the vertical centerline of the device 500.

Figure 6:
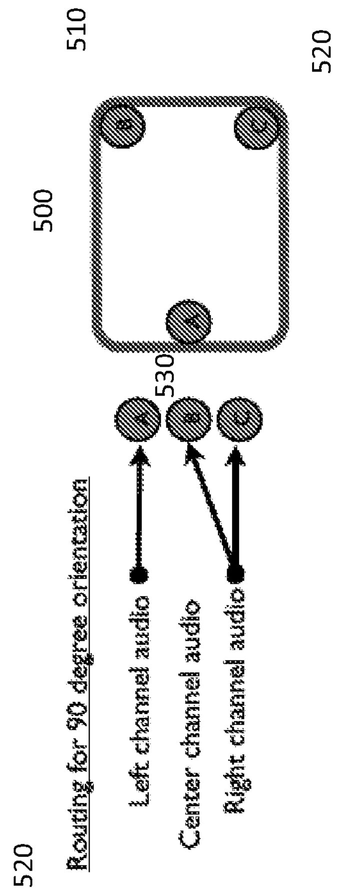
FIG. 6 depicts the second sample portable device of FIG. 4 in a second orientation.

When the device is rotated 90 degrees, as shown in FIG. 6, a new audio map may be constructed and the audio channels remapped to the speakers 510, 520, 530. Now, the front and rear audio channels may be transmitted to the third speaker 530 as it is the sole speaker on the left side of the device 500 in the orientation of FIG. 6. The front right and rear right channels may be mixed and transmitted to both the first and second speakers 510, 520 as they are both on the right side of the device in the present orientation. The center channel may be omitted and not played back, as no speaker is at or near the centerline of the device 500.

It should be appreciated that alternative audio maps may be created, depending on a variety of factors such as user preference, programming of the audio processing router 140, importance or frequency of audio on a given channel and the like. As one example, the center channel may be played through all three speakers 510, 520, 530 when the device 500 is oriented as in FIG. 6 in order to present the audio data encoded thereon.

As another example, the audio processing router 140 may downmix the left front and left rear channels for presentation on the third speaker 530 in the configuration of FIG. 6, but may route the right front audio to the first speaker and the right rear audio to the second speaker 520 instead of mixing them together and playing the result from both the second and third speakers. The decision to mix front and rear (or left and right, or other pairs) of channels may be made, in part, based on the output of the orientation sensor 160. As an example, if the orientation sensor determines that the device 500 is flat on a table in FIG. 6, then the audio processing router 140 may send right front information to the first speaker 510 and right rear audio information to the second speaker 520. Front and rear channels may be preserved, in other words, based on an orientation or a presumed distance from a user as well as based on the physical layout of the speakers.

Figure 7:
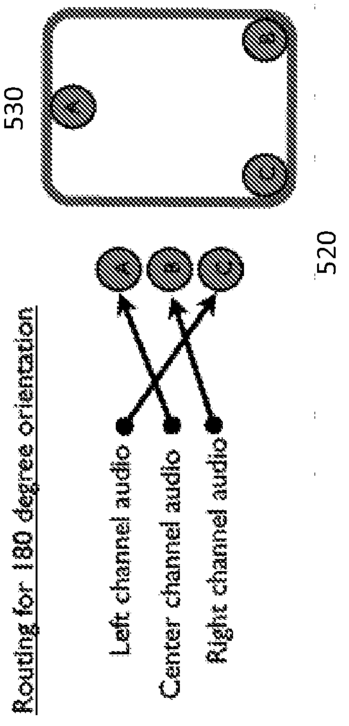
FIG. 7 depicts the second sample portable device of FIG. 4 in a third orientation.

FIG. 7 shows a third sample orientation for the device 500. In this orientation, center channel audio may again be routed to the third speaker 530. Left channel audio may be routed to the second speaker 520 while right channel audio is routed to the first speaker 510. Essentially, in this orientation, the embodiment may reverse the speakers receiving the left and right channels when compared to the orientation of FIG. 5, but the center channel is outputted to the same speaker.

Figure 5:
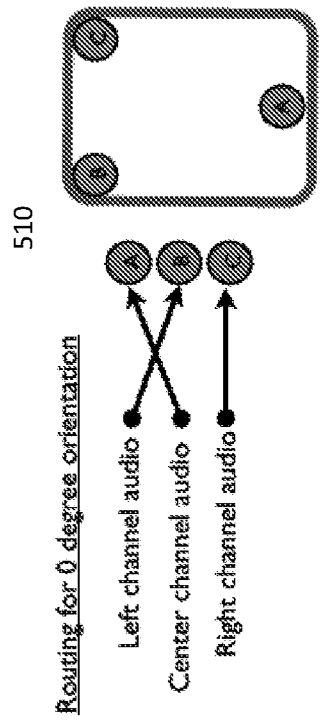
FIG. 5 depicts a second sample portable device having multiple speakers and in a first orientation.
Figure 8:
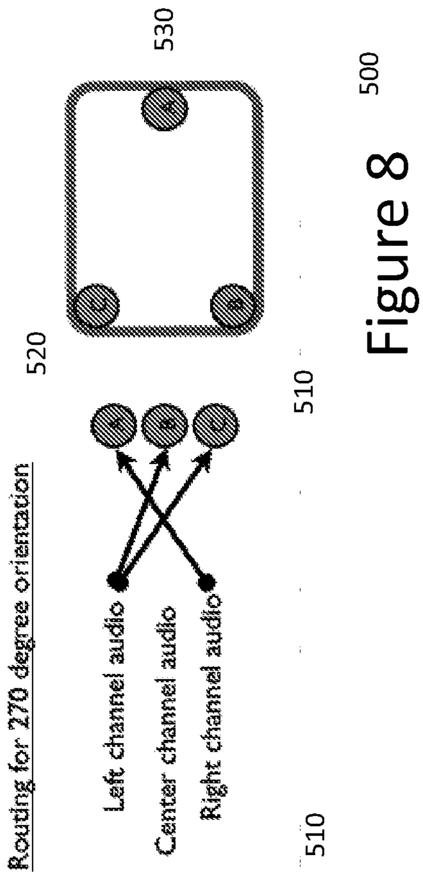
FIG. 8 depicts the second sample portable device of FIG. 4 in a fourth orientation.

FIG. 8 depicts still another orientation for the device of FIG. 5. In this orientation, left channel audio may be routed to the first and second speakers 510, 520 and right channel audio routed to the third speaker 530. Center channel audio may be omitted. In alternative embodiments, center channel audio may be routed to all three speakers equally, or routed to the third speaker and one of the first and second speakers.

Gain may be applied to audio routed to a particular set of speakers. In certain situations, gain is applied in order to equalize audio of the left and right channels (front, rear or both, as the case may be). As one example, consider the orientation of the device 500 in FIG. 8. Two speakers 510, 520 output the left channel audio and one speaker 530 outputs the right channel audio. Accordingly, a gain of 0.5 may be applied to the output of the two speakers 510, 520 to approximately equalize volume between the left and right channels. Alternately, a 2.0 gain could be applied to the right channel audio outputted by the third speaker 530. It should be appreciated that different gain factors may be used, and different gain factors may be used for two speakers even if both are outputting the same audio channels.

Gain may be used to equalize or normalize audio, or a user's perception of audio, in the event an electronic device 100 is laterally moved toward or away from a user. The device 100 may include a motion sensor sensitive to lateral movement, such as a GPS sensor, accelerometer and the like. In some embodiments, a camera integrated into the device 100 may be used; the camera may capture images periodically and compare one to the other. The device 100, through the processor, may recognize a user, for example by extracting the user from the image using known image processing techniques. If the user's position or size changes from one captured image to another, the device may infer that the user has moved in a particular position. This information may be used to adjust the audio being outputted. In yet another embodiment, a presence etector (such as an infrared presence detector or the like) may be used for similar purposes.

For example, if the user (or a portion of the user's body, such as his head) appears smaller, the user has likely moved away from the device and the volume or gain may be increased. If the user appears larger, the user may have moved closer and volume/gain may be decreased. If the user shifts position in an image, he may have moved to one side or the device may have been moved with respect to him. Again, gain may be applied to the audio channels to compensate for this motion. As one example, speakers further away from the user may have a higher gain than speakers near a user; likewise, gain may be increased more quickly for speakers further away than those closer when the relative position of the user changes.

Time delays may also be introduced into one or more audio channels. Time delays may be useful for syncing up audio outputted by a first set of the device's 100 speakers 110 nearer a user and audio outputted by a second set of speakers. The audio emanating from the first set of speakers may be slightly time delayed in order to create a uniform sound with the audio emanating from the second set of speakers, for example. The device 100 may determine what audio to time delay by determining which speakers may be nearer a user based on the device's orientation, as described above, or by determining a distance of various speakers from a user, also as described above.

The foregoing description has broad application. For example, while examples disclosed herein may focus on utilizing a smart phone or mobile computing device, it should be appreciated that the concepts disclosed herein may equally apply to other devices that output audio. As one example, an embodiment may determine an orientation of video outputted by a projector or on a television screen, and route audio according to the principles set forth herein to a variety of speakers in order to match the video orientation. As another example, certain embodiments may determine an orientation of displayed video on an electronic device and match oaudio outputs to corresponding speakers, as described above. However, if the device determines that a video orientation is locked (e.g., the orientation of the video does not rotate as the device rotates), then the device may ignore video orientation and use the device's orientation to create and employ an audio map.

Similarly, although the audio routing method may be discussed with respect to certain operations and orders of operations, it should be appreciated that the techniques disclosed herein may be employed with certain operations omitted, other operations added or the order of operations changed. Accordingly, the discussion of any embodiment is meant only to be an example and is not intended to suggest that the scope of the disclosure, including the claims, is limited to these examples.

We claim:

1. A method for outputting audio from a plurality of speakers associated with an electronic device, comprising:

determining an orientation of video being output for display by the electronic device, wherein the orientation of video is independent of an orientation of the electronic device;

using the determined orientation of video to determine a first set of speakers generally on a left side of the video being output for display by the electronic device;

using the determined orientation of video to determine a second set of speakers generally on a right side of the video being output for display by the electronic device;

routing left channel audio to the first set of speakers for output therefrom; and routing right channel audio to the second set of speakers for output therefrom.

2. The method of claim 1 further comprising the operations of:

determining the orientation of the electronic device;

using the determined orientation of the electronic device in addition to the orientation of video to determine the first set of speakers and second set of speakers.

3. The method of claim 1 further comprising the operations of:

determining the orientation of the electronic device;

using the determined orientation of the electronic device to determine the first set of speakers and second set of speakers.

4. The method of claim 1 further comprising:

determining whether a video orientation is locked;

when the video orientation is locked, determining the orientation of the electronic device; and using the determined orientation of the electronic device to determine the first set of speakers and second set of speakers.

5. The method of claim 1 further comprising:

mixing a left front audio channel and a left rear audio channel to form the left channel audio; and mixing a right front audio channel and a right rear audio channel to form the right channel audio.

6. The method of claim 1 further comprising:

determining whether a speaker is near a center axis of the electronic device;

when a speaker is near the center axis of the electronic device, designating the speaker as a center speaker; and when a speaker is near the center axis of the electronic device, routing center channel audio to the center speaker.

7. The method of claim 6 further comprising, when there is no speaker near the center axis of the electronic device, suppressing the center channel audio.

8. The method of claim 6 further comprising, when there is no speaker near the center axis of the electronic device, routing the center channel audio to the first and second sets of speakers.

9. The method of claim 1 further comprising:

determining whether a first number of speakers in the first set of speakers is not equal to a second number of speakers in the second set of speakers; and when the first number of speakers does not equal the second number of speakers, applying a gain to one of the left channel audio or right channel audio.

10. The method of claim 9, wherein the gain is determined by a ratio of the first number of speakers to the second number of speakers.

11. The method of claim 1 further comprising:

determining whether the first set of speakers is closer to a user than the second set of speakers;

when the first set of speakers is closer to the user, modifying a volume of one of the left channel audio or right channel audio.

12. An apparatus for outputting audio, comprising:

a processing system;

an audio processing router operably connected to the processing system;

a first speaker operably connected to the audio processing router;

a second speaker operably connected to the audio processing router;

a video output operably connected to the processing system, the video output operative to display video;

an orientation sensor operably connected to the audio processing router and operative to output an orientation of the apparatus;

wherein the audio processing router is operative to employ at least one of the orientation of the apparatus and an orientation of the video displayed on the video output to route audio to the first speaker and second speaker for output, and wherein the orientation of the video is independent of the orientation of the apparatus.

13. The apparatus of claim 12, wherein the audio processing router is operative to create a first audio map, based on at least one of the orientation of the apparatus and the orientation of the video displayed on the video output, to map at least one audio channel to each of the first and second speakers.

14. The apparatus of claim 12, wherein the audio processing router is software executed by the processing system.

15. The apparatus of claim 12, wherein the audio processing router is further operative to mix together a first and second audio channel, thereby creating a mixed audio channel for output by the first speaker.

16. The apparatus of claim 15, wherein the audio processing router is further operative to apply a gain to the mixed audio channel, the gain dependent upon the orientation of the apparatus.

17. The apparatus of claim 16, wherein the audio processing router is further operative to apply a gain to the mixed audio channel, the gain dependent upon a distance of the first speaker from a listener.

18. The apparatus of claim 17, further comprising:

a presence detector operatively connected to the audio processing router and providing a presence output;

wherein the audio processing router further employs the presence output to determine the gain.

19. A method for outputting audio from an electronic device, comprising:

determining a first orientation of video being output for display by an electronic device, wherein the first orientation of video is independent of a first orientation of the electronic device;

determining the first orientation of the electronic device;

based on the first orientation of video, routing a first audio channel to a first set of speakers;

based on the first orientation of video, routing a second audio channel to a second set of speakers;

determining that the electronic device is being re-oriented from the first orientation of the electronic device to a second orientation of the electronic device;

based on the second orientation of the electronic device, transitioning the first audio channel to a third set of speakers; and based on the second orientation of the electronic device, transitioning the second audio channel to a fourth set of speakers;

wherein the first set of speakers is different from the third set of speakers;

wherein the second set of speakers is different from the fourth set of speakers; and during the operation of transitioning the first audio channel, playing at least a portion of the first audio channel from at least one of the first set of speakers and third set of speakers.

20. The method of claim 19, further comprising the operation of:

during the operation of transitioning the second audio channel, playing at least a portion of the second audio channel from at least one of the second set of speakers and fourth set of speakers; and wherein the video output for display remains in the first orientation when the electronic device is in the second orientation.

21. The method of claim 19, further comprising matching the transitioning of the first audio channel to a third set of speakers to a rate of rotation; and wherein the video output for display remains in the first orientation when the electronic device is in the second orientation.

* * * * *